United States Patent [19]

Kashiwa et al.

[11] Patent Number: 4,659,792
[45] Date of Patent: Apr. 21, 1987

[54] PROCESS FOR PRODUCTION OF 4-METHYL-1-PENTENE POLYMER OR COPOLYMER

[75] Inventors: Norio Kashiwa, Iwakuni; Kunisuke Fukui, Ohtake, both of Japan

[73] Assignee: Mitsui Petrochemical Industries, Ltd., Tokyo, Japan

[21] Appl. No.: 814,166

[22] Filed: Dec. 23, 1985

Related U.S. Application Data

[63] Continuation of Ser. No. 609,007, May 10, 1984, abandoned.

[30] Foreign Application Priority Data

May 11, 1983 [JP] Japan ............................ 58-80936

[51] Int. Cl.⁴ .................... C08F 4/02; C08F 10/14
[52] U.S. Cl. ............................... 526/73; 502/125; 502/127; 525/268; 526/124; 526/125; 526/128; 526/348.2; 526/348.3; 526/348.4; 526/348.5
[58] Field of Search .............. 526/73, 125, 904; 525/268

[56] References Cited

U.S. PATENT DOCUMENTS

| | | | |
|---|---|---|---|
| 4,287,328 | 9/1981 | Kikuta et al. | 526/97 |
| 4,304,891 | 12/1981 | Sato et al. | 526/97 |
| 4,363,901 | 12/1982 | Kikuta et al. | 526/97 |
| 4,387,198 | 6/1983 | Sato et al. | 526/97 |

FOREIGN PATENT DOCUMENTS

| | | | |
|---|---|---|---|
| 45977 | 2/1982 | European Pat. Off. | 526/128 |
| 1580635 | 12/1980 | United Kingdom | 526/904 |
| 2111066 | 6/1983 | United Kingdom | 526/125 |

Primary Examiner—Edward J. Smith
Attorney, Agent, or Firm—Sherman & Shalloway

[57] ABSTRACT

A process for producing a polymer or copolymer of 4-methyl-1-pentene, which comprises polymerizing 4-methyl-1-pentene or copolymerizing 4-methyl-1-pentene with up to about 20 mole % of an olefin having 2 to 20 carbon atoms in the presence of a catalyst comprising
(A) a solid highly active titanium catalyst component composed of magnesium, titanium, halogen and a diester of a dicarboxylic acid,
(B) an organoaluminum compound, and
(C) an organosilicon compound represented by the following formula

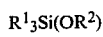

$$R^1_3Si(OR^2)$$

wherein each of $R^1$ and $R^2$ represents a hydrocarbon group with 1 to 5 carbon atoms, and the three $R^1$ groups may be identical or different, wherein prior to the polymerization or copolymerization, a methylpentene is pre-polymerized or pre-copolymerized in the presence of a catalyst comprising the catalyst component (A), a part of the catalyst component (B) and a part of the catalyst component (C) to form about 1 to about 1000 grams, per millimole of titanium atom, of a methylpentene polymer or copolymer.

1 Claim, No Drawings

PROCESS FOR PRODUCTION OF 4-METHYL-1-PENTENE POLYMER OR COPOLYMER

This application is a continuation of application Ser. No. 609,007, filed May 10, 1984, now abandoned.

This invention relates to an improved process for producing a polymer or copolymer of 4-methyl-1-pentene having improved stereoregularity and bulk density with improved catalytic activity by polymerizing 4-methyl-1-pentene or copolymerizing 4-methyl-1-pentene with up to about 20 mole % of an olefin having 2 to 20 carbon atoms.

More specifically, this invention pertains to an improved process for producing a polymer or copolymer of 4-methyl-1-pentene, which comprises polymerizing 4-methyl-1-pentene or copolymerizing 4-methyl-1-pentene with up to about 20 mole% of an olefin having 2 to 20 carbon atoms (an olefin other than 4-methyl-1-pentene) in the presence of a catalyst comprising (A) a solid highly active titanium catalyst component composed of magnesium, titanium, halogen and a diester of a dicarboxylic acid,
(B) an organoaluminum compound, and
(C) an organosilicon compound represented by the following formula $$R^1{}_3Si(OR^2)$$

wherein each of $R^1$ and $R^2$ represents a hydrocarbon group with 1 to 5 carbon atoms, and the three $R^1$ groups may be identical or different,
wherein prior to the polymerization or copolymerization, a methylpentene is pre-polymerized or pre-copolymerized in the presence of a catalyst comprising the catalyst component (A), a part of the catalyst component (B) and a part of the catalyst component (C) to form about 1 to about 1000 grams, per millimole of titanium atom, of a methylpentene polymer or copolymer.

A catalyst comprising (1) a solid highly active titanium catalyst component composed of magnesium, titanium, halogen and an electron donor, (2) an organoaluminum compound and (3) optionally a third component such as a carboxylic acid ester or an organosilicon compound has previously been known to be useful for the production of stereoregular polymers or copolymers of alpha-olefins having at least 3 carbon atoms, and many proposals have been made on this type of catalyst in the past. In particular, much work has been done on this type of catalysts suitable for the production of stereoregular propylene polymer or copolymers. A number of improvements has been proposed on catalysts which can give highly stereoregular polypropylene in high yields.

When catalysts suitable for the polymerization of propylene are applied to the polymerization of 4-methyl-1-pentene, they show a fairly high level of performance but do not prove to be entirely satisfactory in regard to the yield of the 4-methyl-1-pentene polymer per unit weight of the catalyst or the proportion of a stereoregular 4-methyl-1-pentene polymer in the resulting polymerization product.

For example, Japanese Laid-Open Patent Publication No. 63310/1982 (corresponding to European Patent Application No. 45,977) discloses a catalyst for polymerization of olefins which can generally encompass a catalyst composed of (a) an aluminum alkyl compound, (b) a silicon compound containing at least one bond selected from the group consisting of an Si—OR bond, an Si—OCOR bond and an Si—NR$_2$ bond wherein R represents a hydrocarbonyl group, and (c) a solid highly active titanium catalyst component composed of magnesium, titanium, halogen and a diester.

This patent document illustrates propylene, butene-1, styrene and 4-methylpentene as examples of the alpha-olefin to be polymerized, but all of the working examples in this patent document are directed to the polymerization of propylene. No specific working example is given about the polymerization of 4-methyl-1-pentene. This patent document describes as the silicon compound (b) compounds of the formula $R_mSiY_nX_p$ wherein R represents a $C_1$–$C_{20}$ alkyl, alkenyl, aryl, arylalkyl or cycloalkyl group, Y represents —OR', OOCOR' or —NR$_2$' in which R' is identical to or different from R and has the same meaning as R, X represents a halogen or hydrogen atom, the group —OCOR" or the group —NR$_2$" in which R" is identical to or different from R' and has the same meaning as R', m is a number of from 0 to 3, n is a number of from 1 to 4 and p is a number of from 0 to 1, provided that the sum of m, n and p is 4. It, however, fails to show a compound of the above formula wherein m=3, n=1, p=0 and Y is —OR', which compound can be included within the formula $R^1{}_3Si(OR^2)$ representing the catalyst component (C) in the present invention. Naturally, it fails to show any working example in which such a compound falling within the formula of component (C) in this invention was used.

The present inventors have made investigations in order to develop a process for polymerizing or copolymerizing alpha-olefins having at least 3 carbon atom, especially 4-methyl-1-pentene to give a highly stereoregular polymer or copolymer of such an olefin with a high catalytic efficiency. These investigations have led to the discovery that to achieve an improvement on the polymerization or copolymerization of 4-methyl-1-pentene, it is important to meet a combination of two parameters, i.e. the selection of a catalyst system composed of specific components and the pre-polymerization or pre-copolymerization of a methylpentene.

Investigations of the present inventors have shown that a polymer or copolymer of 4-methyl-1-pentene having improved stereoregularity and bulk density can be produced advantageously on an industrial scale with improved catalytic activity by polymerizing 4-methyl-1-pentene or copolymerizing 4-methyl-1-pentene with up to about 20 mole% of an olefin having 2 to 20 carbon atoms under a combination of the following two parameters, namely I. the use of a catalyst comprising
(A) a solid highly active titanium catalyst component composed of magnesium, titanium, halogen and a diester of a dicarboxylic acid,
(B) an organoaluminum compound, and
(C) an organosilicon compound represented by the following formula $$R^1{}_3Si(OR^2)$$

wherein each of $R^1$ and $R^2$ represents a hydrocarbon group having 1 to 5 carbon atoms and the three $R^1$ groups may be identical or different; and II. prior to the polymerization or copolymerization, a methylpentene is pre-polymerized or precopolymerized in the presence of a catalyst comprising the catalyst component (A), a part of the catalyst component (B) and a part of the catalyst component (C) to form about 1 to about 1000 grams, per millimole of titanium atom, of a methylpentene polymer or copolymer.

The investigations of the present inventors have also shown that in performing the aforesaid prepolymerization or pre-copolymerization, the organoaluminum compound (B) and the organosilicon compound (C) can be used only partially, and the remainder of these components may be added to the reaction system at the time of polymerization or copolymerization.

It is an object of this invention to provide an improved process for producing a polymer or copolymer of 4-methyl-1-pentene.

The above and other objects and advantages of this invention will become more apparent from the following description.

In the following description, the term polymerization is sometimes used to mean both homopolymerization and copolymerization, and the term polymer, to mean both a homopolymer and a copolymer.

The solid highly active titanium catalyst component (A) that can be used in this invention contains magnesium, titanium, halogen and a diester of a dicarboxylic acid as essential components.

The titanium catalyst component (A) desirably has a magnesium/titanium atomic ratio of from about 2 to about 100, preferably from about 4 to about 70, a halogen/titanium atomic ratio of from about 4 to about 100, preferably from about 6 to about 40, and a diester/titanium mole ratio of from about 0.2 to about 10, preferably from about 0.4 to about 6. The specific surface area of the titanium catalyst component (A) is preferably at least about 3 $m^2/g$, more preferably at least about 40 $m^2/g$, especially preferably about 100 $m^2/g$, to about 800 $m^2/g$.

Usually, the titanium catalyst component (A) does not substantially liberate a titanium compound when treated by a simple means such as washing with hexane at room temperature.

The X-ray spectrum of the titanium catalyst component (A) shows that irrespective of the starting magnesium compound used for its preparation, it shows an amorphous nature with regard to the magnesium compound or it is much more amorphous than a usual commercially available magnesium dihalide.

In addition to the aforesaid essential components, the titanium catalyst component (A) may further include other elements, metals, functional groups, electron donors, etc. to an extent that they do not adversely affect the performance of the catalyst. Or the component (A) may be diluted with an organic or inorganic diluent.

Preferably, the titanium catalyst component (A) has an average particle diameter of about 1 to about 200 microns, more preferably about 5 to about 100 microns, and the geometric deviation of its particle size distribution $\delta_g$, is preferably less than 2.1, more preferably not more than 1.95.

Preferably, the titanium catalyst component (A) has such a shape as a true spherical shape, an elliptical shape or a granular shape, and the shape is uniform.

The titanium catalyst component (A) may be prepared by contacting a magnesium compound (or metallic magnesium), a titanium compound and a diester or a compound capable of forming a diester with one another with or without using another reagent in accordance with the same method of preparing known highly active titanium catalyst components, which are disclosed, for example, in British Patent Specification Nos. 1492618, 1554340 and 1554248, U.S. Pat. Nos. 4157435, 4076924, 4085276, 4250285, 4232139, 4143223, 4315874, 4330649, 4401589 and 4335015, and European Patent Specification No. 22675.

Some examples of the procedure of producing the titanium catalyst component (A) are sumarized below.

(1) A magnesium compound or a complex of a magnesium compound and an electron donor is pre-treated or not-pretreated with an electron donor and/or a reaction aid such as an organoaluminum compound or a halogen-containing silicon compound in the presence or absence of an electron donor or a pulverization aid with or without pulverization. The resulting solid is reacted with a titanium compound which is in the liquid state under the reaction conditions. In the above procedure, a diester of a dicarboxylic acid or a compound capable of forming the diester is used at least once as the electron donor.

(2) A magnesium compound in the liquid state having no reducing ability is reacted with a titanium compound in the liquid state in the presence of a diester of a dicarboxylic acid or a compound capable of forming the diester to precipitate a solid titanium complex.

(3) The product obtained in (2) above is further reacted with a titanium compound.

(4) The product obtained in (1) or (2) is further reacted with a titanium compound and as an electron donor, a diester of a dicarboxylic acid or a compound capable of forming the diester.

(5) A magnesium compound or a complex of a magnesium compound and an electron donor is pulverized in the presence of a titanium compound and in the presence or absence of an electron donor and a pulverization aid, and with or without pre-treatment with an electron donor and/or a reaction aid such as an organoaluminum compound or a halogen-containing silicon compound, treated with a halogen, a halogen compound or an aromatic hydrocarbon. In the above procedure, a diester of a dicarboxylic acid or a compound capable of forming the diester is used at least once as the electron donor.

Preferred among these methods are those in which a liquid titanium halide is used, or a halogenated hydrocarbon is used after or during the use of the titanium compound.

The electron donor used in the above methods of preparation is not necessarily limited to the diester or diester-forming compound. There may be used other electron donors such as alcohols, phenols, aldehydes, ketones, ethers, carboxylic acids, carboxylic acid anhydrides, carbonic acid esters, monoesters and amines. It is essential however that the diester of a dicarboxylic acid or the diester-forming compound be used at least once.

Preferred examples of the diester as an essential component of the solid highly active titanium catalyst component (A) used in this invention include diesters of dicarboxylic acids in which two carboxyl groups are attached to one carbon atom of the hydrocarbon moiety or dicarboxylic acids in which one carboxyl group is attached to each of the two adjoining carbon atoms of the hydrocarbon moiety, and diesters of dicarboxylic acids in which one carboxyl group is attached to each of the two adjoining carbon atoms of the heterocyclic compound moiety containing at least two carbon atoms.

More specific examples of the preferred diesters are diesters, preferably di($C_1$–$C_{20}$)alkyl esters in which the two alkyl groups may be identical or different, of dicarboxylic acids in which two carboxyl groups are attached to one carbon atom of an aliphatic hydrocarbon moiety having 1 to 20 carbon atoms or dicarboxylic acids in which one carboxyl group is attached to each of the two adjoining carbon atoms of an aliphatic hydrocarbon moiety having 2 to 20 carbon atoms; diesters, preferably di($C_1$–$C_{20}$)alkyl esters in which the two alkyl esters may be identical or different, of dicarboxylic acids in which two carboxyl groups are attached to one carbon atom of an alicyclic hydrocarbon moiety having 3 to 20 carbon atoms or dicarboxylic acids in which one carboxyl group is attached to each of the two adjoining carbon atoms of the aforesaid alicyclic hydrocarbon moiety; diesters, preferably di($C_1$–$C_{20}$)alkyl esters in which the two alkyl groups may be identical or different, of dicarboxylic acids in which one carboxyl group is attached to each of the adjoining carbon atoms (at the ortho-position) of an aromatic hydrocarbon moiety having 6 to 20 carbon atoms; and diesters, preferably di($C_1$–$C_{20}$)alkyl esters, of dicarboxylic acids in which one carboxyl group is attached to each of the two adjoining carbon atoms of a heterocyclic compound moiety containing at least two carbon atoms and 1 to 10 hetero atoms selected from the group consisting of O, N and S atoms.

Specific examples of the dicarboxylic acids exemplified above include malonic acid; substituted malonic acids such as methylmalonic acid, ethylmalonic acid, isopropylmalonic acid, allylmalonic acid, and phenylmalonic acid; succinic acid; substituted succinic acids such as methylsuccinic acid, dimethylsuccinic acid, ethylsuccinic acid, methylethylsuccinic acid and itaconic acid; maleic acid; substituted maleic acids such as citraconic acid and dimethylmaleic acid, fumaric acid; substituted fumaric acid such as methylfumaric acid and ethylfumaric acid alicyclic dicarboxylic acids such as cyclopentane-1,1-dicarboxylic acid, cyclopentane-1,2-dicarboxylic acid, cyclohexane-1,2-dicarboxylic acid, cyclohexene-1,2-dicarboxylic acid, cyclohexene-2,3-dicarboxylic acid cyclohexene-3,4-dicarboxylic acid, cyclohexene-4,5-dicarboxylic acid, Nadic Acid, Methylnadic Acid, and 1-allylcyclohexane-3,4-dicarboxylic acid; aromatic dicarboxylic acids such as phthalic acid, naphthalene-1,2-dicarboxylic acid and naphthalene-2,3-dicarboxylic acid; and heterocyclic dicarboxylic acids such as furane-3,4-dicarboxylic acid, 4,5-dihydrofurane-2,3-dicarboxylic acid, benzopyran-3,4-dicarboxylic acid, pyrrole-2,3-dicarboxylic acid, pyridine-2,3-dicarboxylic acid, thiophene-3,4-dicarboxylic acid, and indole-2,3-dicarboxylic acid.

Preferably, at least one of the alcohol components of the dicarboxylic acid diesters exemplified above has at least 2 carbon atoms, for example 2 to 20 carbon atoms, especially at least 3 carbon atoms. It is above all preferred that both of the alcohol components have at least 2 carbon atoms, especially at least 3 carbon atoms. Examples include the diethyl esters, diisopropyl esters, di-n-propyl esters, di-n-butyl esters, diisobutyl esters, di-tert-butyl esters, diisoamyl esters, di-n-hexyl esters, di-2-ethylhexyl esters, di-n-octyl esters, diisodecyl esters, and ethyl-n-butyl esters of the above-exemplified dicarboxylic acids.

Both a magnesium compound having reducing ability and a magnesium compound having no reducing ability can be utilized in the preparation of the solid highly active titanium catalyst component (A).

The former includes, for example, magnesium compounds having a magnesium-carbon bond or a magnesium-hydrogen bond, for example di($C_1$–$C_{20}$ alkyl)magnesiums such as dimethyl magnesium, diethyl magnesium, dipropyl magnesium, dibutyl magnesium, ethylbutyl magnesium, diamyl magnesium, dihexyl magnesium and didecyl magnesium; $C_1$–$C_{20}$ alkylmagnesium chlorides such as ethylmagnesium chloride, propylmagnesium chloride, butylmagnesium chloride, hexylmagnesium chloride and amylmagnesium chloride; $C_1$–$C_{20}$ alkyl-$C_1$–$C_{20}$ alkoxymagnesiums such as butylethoxy magnesium; and $C_1$–$C_{20}$ alkylmagnesium hydrides such as butylmagnesium hydride. These magnesium compounds may be used in the form of a complex with an organoaluminum compound, for example, or may be in the form of a liquid or a solid.

The latter includes, for example, magnesium halides such as magnesium chloride, magnesium bromide, magnesium iodide and magnesium fluoride; $C_1$–$C_{20}$ alkoxymagnesium halides such as methoxymagnesium chloride, ethoxymagnesium chloride, isopropoxymagnesium chloride, butoxymagnesium chloride and octoxymagnesium chloride; $C_6$–$C_{20}$ aryloxymagnesium halides such as phenoxy magnesium chloride and methylphenoxymagnesium chloride; $C_1$–$C_{20}$ alkoxymagnesiums such as ethoxy magnesium, isopropoxy magnesium, butoxy magnesium, n-octoxy magnesium, and 2-ethylhexoxy magnesium; $C_6$–$C_{20}$ aryloxy magnesiums such as phenoxy magnesium and dimethylphenoxy magnesium; and carboxylic acid salts of magnesium such as magnesium laurate and magnesium stearate. These magnesium compounds having no reducing ability may be derived from the aforesaid magnesium compounds having reducing ability, or those derived during the preparation of the catalyst component. The above magnesium compounds may be a complex with other metals or mixtures of other metal compounds. Or they may be a mixture of two or more of these compounds.

Preferred are the magnesium compounds having no reducing ability, and halogen-containing magnesium compounds, particularly, magnesium chloride, alkoxy magnesium chlorides and aryloxymagnesium chlorides are preferred.

Suitable titanium compounds used to prepare the titanium catalyst component (A) are tetravalent titanium compounds represented by Ti(OR)$_g$X$_{4-g}$ in which R is a hydrocarbon group, X is halogen and g is 0 to 4. Examples of R are alkyl groups having 1 to 6 carbon atoms. Examples of X are Cl, Br and I.

Specific examples of such titanium compounds include titanium tetrahalides such as TiCl$_4$, TiBr$_4$ and TiI$_4$; alkoxytitanium trihalides such as Ti(OCH$_3$)Cl$_3$, Ti(OC$_2$H$_5$)Cl$_3$, Ti(On-C$_4$H$_9$)Cl$_3$, Ti(OC$_2$H$_5$)Br$_3$ and Ti(Oiso-C$_4$H$_9$)Br$_3$; alkoxytitanium dihalides such as Ti(OCH$_3$)$_2$Cl$_2$, Ti(OC$_2$H$_5$)$_2$Cl$_2$, Ti(On-C$_4$H$_9$)$_2$Cl$_2$ and Ti(OC$_2$H$_5$)$_2$Br$_2$; trialkoxytitanium monohalides such as Ti(OCH$_3$)$_3$Cl, Ti(OC$_2$H$_5$)$_3$Cl, Ti(On-C$_4$H$_9$)$_3$Cl and Ti(OC$_2$H$_5$)$_3$Br; and tetraalkoxytitaniums such as Ti(OCH$_3$)$_4$, Ti(OC$_2$H$_5$)$_4$ and Ti(On-C$_4$H$_9$)$_4$. Among them, the halogen-containing titanium compounds, particularly titanium tetrahalides, especially preferably titanium tetrachloride, are preferred. These titanium compounds may be used singly or as a mixture. Or they may be used as diluted in hydrocarbons or halogenated hydrocarbons.

In the preparation of the titanium catalyst component (A), the amounts of the titanium compound, the magnesium compound the electron donor to be supported, and the other electron donors such as alcohols, phenols, monocarboxylic acid esters, the silicon compound and the aluminum compound which may be used as required differ depending upon the method of preparation and cannot be defined in a general manner. For example, about 0.1 to about 10 moles of the electron donor to be supported and about 0.05 mole to about 1000 moles of the titanium compound may be used per mole of the magnesium compound.

In the present invention, a catalyst composed of the solid highly active titanium catalyst component composed of magnesium, titanium, halogen and a diester of a dicarboxylic acid prepared as above, (B) an organoaluminum compound and (C) an organosilicon compound of the formula $R^1{}_3Si(OR^2)$ is used.

Examples of the organoaluminum compound (B) include (i) organoaluminum compounds at least having an Al-carbon bond in the molecule, for example organoaluminum compounds represented by the general formula $$R^3{}_mAl(OR^4)_nH_pX_q$$

wherein each of $R^3$ and $R^4$ represents a hydrocarbon, for example a $C_1$–$C_{15}$ hydrocarbon group, preferably $C_1$–$C_4$ hydrocarbon group, X represents a halogen atom such as Cl, Br or I, $0 < m \leq 3$, $0 \leq n < 3$, $0 \leq p < 3$, $0 \leq q < 3$, provided that $m+n+p+q=3$, and (ii) complex alkylated products of aluminum and a metal of Group I of the periodic table represented by the following general formula $$M^1AlR^3{}_4$$

wherein $M^1$ is Li, Na or K, and $R^3$ is as defined above.

Examples of the hydrocarbon groups for $R^3$ and $R^4$ are alkyl groups.

Examples of the organoaluminum compounds (i) are those of the general formulae $$R^3{}_mAl(OR^4)_{3-m}$$

wherein $R^3$ and $R^4$ are as defined above, and m is preferably a number represented by $1.5 \leq m \leq 3$, $$R^3{}_mAlX_{3-m}$$

wherein $R^3$ and x are as defined above, and m is preferably a number represented by $0 < m < 3$, $$R^3{}_mAlH_{3-m}$$

wherein $R^3$ is as defined above, and m is preferably a number represented by $2 \leq m < 3$, and $$R^3{}_mAl(OR^4)_nX_q$$

wherein $R^3$ and $R^4$ are as defined above, X is the same halogen as above, $0 < m \leq 3$, $0 \leq n < 3$, $0 \leq q < 3$, $m+n+q=3$.

Examples of the organoaluminum compounds (i) include trialkyl aluminums such as triethyl aluminum and tributyl aluminum; trialkenyl aluminums such as triisoprenyl aluminum; dialkyl aluminum alkoxides such as diethyl aluminum ethoxide and dibutyl aluminum butoxide; partially alkoxylated alkyl aluminums such as alkyl aluminum sesquialkoxides (e.g., ethyl aluminum sesquiethoxide and butylaluminum sesquibutoxide) and partially alkoxylated alkyl aluminums having the average composition represented by $R^1{}_{2.5}Al(OR^2)_{0.5}$; dialkyl aluminum halides such as diethyl aluminum chloride, dibutyl aluminum chloride and diethyl aluminum bromide; alkyl aluminum sesquihalides such as ethyl aluminum sesquichloride, butyl aluminum sesquichloride and ethyl aluminum sesquibromide; partially halogenated alkyl aluminums, for example alkyl aluminum dihalides such as ethyl aluminum dichloride, propyl aluminum dichloride and butyl aluminum dibromide; other partially hydrogenated alkyl aluminums, for example alkyl aluminum dihydrides such as ethyl aluminum dihydride and propyl aluminum dihydride; and partially alkoxylated and halogenated alkyl aluminums such as ethyl aluminum ethoxychloride, ethyl aluminum butoxy chloride and ethyl aluminum ethoxy bromide.

$LiAl(C_2H_5)_4$ and $LiAl(C_7H_{15})_4$ may be cited as examples of the compounds (ii).

There may also be used organic aluminum compounds in which two or more aluminum atoms are bonded through an oxygen or nitrogen atom, which are similar to the compounds (i). Examples are $(C_2H_5)_2AlOAl(C_2H_5)_2$, $(C_4H_9)_2AlOAl(C_4H_9)_2$, and $$\underset{\underset{C_2H_5}{|}}{(C_2H_5)_2AlNAl(C_2H_5)_2}.$$

Of these, the trialkyl aluminums and the alkyl aluminums in which two or more aluminum atoms are bonded are preferred.

The organosilicon compound (C) constituting the catalyst of this invention together with the components (A) and (B) described above is represented by the following formula $$R^1{}_3Si(OR^2).$$

In the formula, $R^1$ and $R^2$ each represent a hydrocarbon group having 1 to 5 carbon atoms, and the three $R^1$ groups may be identical or different.

Examples of the hydrocarbon group for $R^1$ and $R^2$ are alkyl, alkenyl, cycloalkyl, haloalkyl and alkoxyalkyl groups having 1 to 5 carbon atoms. Specific examples of the organosilicon compound (C) are trimethylmethoxysilane, trimethylethoxysilane, trimethyl-n-propoxysilane, triethylmethoxysilane, tri-n-propylmethoxysilane, tri-iso-propylmethoxysilane, tri-n-butylmethoxysilane, tri-iso-butylmethoxysilane, tri-n-amylmethoxysilane and tri-iso-amylmethoxysilane.

In the present invention, 4-methyl-1-pentene is polymerized in the presence of the catalyst composed of the components (A), (B) and (C) described above. Prior to the polymerization, a methylpentene is prepolymerized in a hydrocarbon medium in the presence of the component (A), a part of the component (B) and a part of the component (C) to form about 1 to about 1000 g, per millimole of titanium in the component (A), of a polymer of the methylpentene. By performing the prepolymerization, a powdery polymer having a high bulk density can be obtained in the subsequent slurry polymerization of 4-methyl-1-pentene. Accordingly, this offers the advantage that the performance of the slurry is good and the operation can be carried out at high polymer concentrations. Another advantage is that the amount of the polymer yielded per unit amount of the catalsyt is large, and a stereoregular polymer can be produced in a high proportion.

The methylpentene used in the pre-polymerization can be selected from 3-methyl-1-pentene, 4-methyl-1-pentene, 4,4-dimethyl-1-pentene, etc. Preferably, the pre-polymerization is carried out under relatively mild conditions and under such conditions that the pre-polymer obtained does not dissolve in the polymerization medium. For this purpose, the polymerization medium is preferably an inert hydrocarbon, for example an aliphatic hydrocarbon such as butane, pentane, hexane, heptane, octane, decane, dodecane and kerosene, and an alicyclic hydrocarbon such as cyclopentane and cyclohexane.

In the pre-polymerization, it is preferred to use the titanium catalyst component (A) in an amount, calculated as titanium atom, of about 0.5 to aobut 1000 millimoles, particularly about 1 to about 10 millimoles per liter of the hydrocarbon medium. The organoaluminum compound (B) is used preferably in an Al/Ti atomic ratio of from about 1 to about 100, particularly from about 2 to about 20, and the organosilicon compound (C) is used preferably in an amount of about 0.01 to about 2 moles, particularly about 0.02 to about 1 mole, per mole of the component (B).

The amount of the methylpentene pre-polymerized is in the range of about 1 to about 1000 g, preferably about 3 to about 100 g, per millimole of the titanium in the component (A). The concentration of the methylpentene in the pre-polymerization is preferably not more than about 1 mole, especially not more than about 0.5 mole, per liter of the hydrocarbon medium.

Desirably, the pre-polymerization is carried out at a temperature at which the resulting pre-polymer does not dissolve in the hydrocarbon medium. The temperature varies depending upon the kind of the hydrocarbon medium, but is, for example, about −20° C. to about +70° C., preferably about 0° C. to about 50° C. The pre-polymerization pressure may, for example, be atmospheric pressure to about 10 kg/cm².

In the process of this invention, 4-methyl-1-pentene is polymerized or copolymerized by using the catalyst subjected to the pre-polymerization treatment. At this time, additional amounts of the component (B) and/or the component (C) may be supplied. Preferably, the component (B) is additionally used in an amount of about 1 to aobut 1000 moles, especially about 10 to about 500 moles, per mole of the titanium and the component (C), in an amount of about 0.005 to about 2 moles, particularly about 0.01 to about 1 mole, per mole of the component (B).

When 4-methyl-1-pentene is to be copolymerized, ethylene and/or another alpha-olefin may be properly chosen. The comonomer may, for example, be an olefin having 2 to 20 carbon atoms other than 4-methyl-1-pentene such as ethylene, propylene, 1-butene, 1-pentene, 1-pentene, 1-hexene, 1-octene, 1-decene, 1-dodecene, 1-tetradecene, 1-octadecene and 3-methyl-1-pentene. In the copolymerization, the proportion of the comonomer is desirably selected such that the content of 4-methyl-1-pentene in the resulting copolymer becomes at least about 80 mole%, particularly at least about 90 mole %.

Polymerization of 4-methyl-1-pentene is carried out preferably by the slurry polymerization technique. The polymerization medium may be 4-methyl-1-pentene itself, or an inert hydrocarbon such as those exemplified hereinabove for the pre-polymerization.

The polymerization temperature may be properly selected from those at which the slurry polymerization is possible. It varies depending upon the kind of the polymerization medium, but is preferably from about 20° C. to about 100° C., preferably from about 30° C. to about 80° C. It is preferred to employ a polymerization temperature higher (for example, at least about 5° C. higher) than the temperature at which the prepolymerization or pre-copolymerization is carried out. A molecular weight controlling agent such as hydrogen may be used as required in order to control the molecular weight of the resulting polymer.

The polymerization pressure may, for example, be from atmospheric pressure to about 20 kg/cm².

According to this invention, the yield of the polymer per unit amount of titanium is high, and the proportion of a stereoregular polymer formed is high. In particularly, in the copolymerization of 4-methyl-1-pentene with ethylene and/or another alpha-olefin, the proportion of a solvent-soluble polymer formed is small, and the resulting copolymer shows a single melting point and has a narrow composition distribution.

The following examples and comparative examples illustrate the present invention more specifically.

EXAMPLE 1

Preparation of a Titanium Catalyst Component (A)

Anhydrous magnesium chloride (4.76 g; 50 mmoles), 25 ml of decane and 23.4 ml (150 mmoles) of 2-ethylhexyl alcohol were heated at 130° C. for 2 hours to form a uniform solution. To the solution was added 1.11 g (7.5 mmoles) of phthalic anhydride, and the mixture was stirred at 130° C. for 1 hour to dissolve phthalic anhydride in the uniform solution. The resulting uniform solution was cooled to room temperature, and added otherwise over 1 hour to 200 ml (1.8 moles) of titanium tetrachloride kept at −20° C. After the addition, the mixture was heated to 110° C. over 4 hours. When its temperature reached 110° C., 2.68 ml (12.5 mmoles) of diisobutyl phthalate was added, and the mixture was maintained at this temperature for 2 hours with stirring. After the 2-hours reaction, the reaction mixture was hot-filtered to collect the solid portion. The solid portion was again suspended in 200 ml of TiCl₄, and reacted again at 110° C. for 2 hours. After the reaction, the solid portion was collected again by hot filtration. It was fully washed with decane and hexane at 110° C. until no free titanium compound was detected from the washings. The titanium catalyst component (A) so prepared was stored as a hexane slurry. A part of the component (A), however, was dried in order to examine its compoposition. It was found that the titanium catalyst component (A) contained 3.1% by weight of titanium, 56.0% by weight of chlorine, 17.0% by weight of magnesium and 20.9% by weight of diisobutyl phthalate.

Prepolymerization

A 500 ml flask was charged with 200 ml of n-decane, 10 mmoles of triethyl aluminum, 2 mmoles of trimethylmethoxysilane and 1 mmole, calculated as titanium atom, of the titanium catalyst component (A). While maintaining a temperature of 25° C., 30 g of 4-methyl-1-pentene was added over the course of 60 minutes, and further reacted at 25° C. for 30 minutes. The reaction product was filtered by a glass filter, washed three times with 300 ml in total of n-decane, and again suspended in 200 ml of n-decane. The amount of 4-methyl-1-pentene pre-polymerized was 30 g per mmole of titanium.

Polymerization

A 1-liter autoclave was charged with 500 ml of 4-methyl-1-pentene, 0.5 mmole of triethyl aluminum, 0.05 mmole of trimethylmethoxysilane, 0.0025 mmole, calculated as titanium atom, of the pre-polymerization product, and 250 ml of hydrogen, and 4-methyl-1-pentene was polymerized at 50° C. for 30 minutes. Methanol was added to stop the polymerization. The polymerization product was filtered by a glass filter to separate it into a white powdery poly(4-methyl-1-pentene) and a solvent-soluble polymer.

The stereoregularity index (II) of the polymer was expressed as a percentage of a boiling n-heptane-insoluble portion based on the total amount of the polymer. The polymerization activity was expressed as grams of the entire polymer per mmole of titanium. The polymerization activity, the II and the bulk density are shown in Table 1.

COMPARATIVE EXAMPLE 1

4-Methyl-1-pentene was polymerized under the same conditions as in Example 1 except that the titanium catalyst component (A) was not subjected to the prepolymerization treatment. The results are shown in Table 1. These results show the effects of the prepolymerization.

COMPARATIVE EXAMPLE 2

The same polymerization as in Example 1 was performed except that diphenyldimethoxysilane capable of exhibiting high performance in the polymerization of propylene was used as the organosilicon compound. The results are shown in Table 1.

COMPARATIVE EXAMPLE 3

The same polymerization as in Example 1 was carried out except that diphenyldimethoxysilane was used as the organic silicon compound in the pre-polymerization, and trimethylmethoxysilane was used as the organosilicon compound in the polymerization. The results are shown in Table 1.

COMPARATIVE EXAMPLE 4

The same polymerization as in Example 1 was carried out except that trimethylmethoxysilane was used as the organosilicon compound in the pre-polymerization, and diphenyldimethoxysilane was used as the organosilicon compound in the polymerization. The results are shown in Table 1.

The results obtained in Comparative Examples 3 and 4 show that the organosilicon compound of the formula $R^1_3Si(OR^2)$ is necessary both in the pre-polymerization and the polymerization.

EXAMPLES 2 AND 3

Example 1 was repeated except that the organosilicon compounds used in the polymerization and the prepolymerization were changed as shown in Table 1. The results are also shown in Table 1.

TABLE 1

| Example (Ex.) or Comparative Example (CEx.) | Pre-polymerization | Silcon compound used in the pre-polymerization | Silicon compound used in the polymerization | Results of the polymerization | | |
|---|---|---|---|---|---|---|
| | | | | polymerization activity (g/mmole · Ti) | II (%) | Bulk density (g/ml) |
| Ex. 1 | Yes | Trimethylmethoxysilane | Trimethylmethoxysilane | 24,000 | 98.2 | 0.40 |
| CEx. 1 | No | None | Trimethylmethoxysilane | 11,000 | 96.5 | 0.31 |
| CEx. 2 | Yes | Diphenyldimethoxysilane | Diphenyldimethoxysilane | 4,300 | 91.7 | 0.39 |
| CEx. 3 | Yes | Diphenyldimethoxysilane | Trimethylmethoxysilane | 6,700 | 93.6 | 0.38 |
| CEx. 4 | Yes | Trimethylmethoxysilane | Diphenyldimethoxysilane | 5,000 | 90.9 | 0.38 |
| Ex. 2 | Yes | Trimethylethoxysilane | Trimethylmethoxysilane | 17,100 | 97.9 | 0.40 |
| Ex. 3 | Yes | Triethylmethoxysilane | Triethylethoxysilane | 25,600 | 98.1 | 0.40 |

EXAMPLE 4

A 1-liter autoclave was charged with 500 ml of 4-methyl-1-pentene, 10 ml of 1-decene, 0.5 mmoles of triethyl aluminum, 0.05 mmole of trimethylmethoxysilane, 0.0025 mmole, calculated as titanium atom, of the pre-polymerization product as prepared in Example 1, and 250 ml of hydrogen, and the monomers were polymerized at 50° C. for 30 minutes. Methanol was added to stop the polymerization. The polymerization product was filtered by a glass filter to separate it into a white powdery 4-methyl-1-pentene/1-decene copolymer and a solvent-soluble polymer. The polymerization activity, the amount of the solvent-soluble polymer and the decene content, the melting point and bulk density of the powdery copolymer are shown in Table 2.

The melting point was measured as follows by using DSC. The sample was heated from room temperature to 280° C., and then cooled from 280° C. to −20° C. After this preliminary treatment, the sample was again heated and its melting point was measured. The rate of temperature elevation and lowering was 10° C./min.

COMPARATIVE EXAMPLE 5

The same polymerization as in Example 4 was carried out except that the titanium catalyst component prepared in Example 1 was used without the pre-polymerization. The results are shown in Table 2. The results show the effect of the prepolymerization.

COMPARATIVE EXAMPLE 6

Example 4 was repeated except that diphenylmethoxysilane was used as the organosilicon compound in the pre-polymerization and the polymerization. The results are shown in Table 2. The results show the effect of using the specific organosilicon compound.

EXAMPLES 5 AND 6

Example 4 was repeated except that 1-hexene or 1-octadecene was used as the comonomer. The results are shown in Table 2.

EXAMPLES 7 TO 9

Example 4 was repeated except that trimethylethoxysilane, triethylmethoxysilane or tri-n-propylmethoxysilane was used as the organosilicon compound in the pre-polymerization and the polymerization. The results are shown in Table 2.

TABLE 2

| Example (Ex.) or Comparative Example (CEx.) | Pre-polymerization | Silicon compound in the pre-polymerization and the polymerization | Comonomer | Polymerization activity (g/mmoles·Ti) | Amount of solvent-soluble polymer (wt. %) | Bulk density (g/ml) | Content of the comonomer (wt. %) | Melting point (°C.) |
| --- | --- | --- | --- | --- | --- | --- | --- | --- |
| Ex. 4 | Yes | Trimethylmethoxysilane | 1-Decene | 34,800 | 2.1 | 0.40 | 2.7 | 225 |
| CEx. 5 | No | " | " | 11,500 | 6.3 | 0.32 | 3.0 | 225 |
| CEx. 6 | Yes | Diphenyldimethoxysilane | " | 5,200 | 10.4 | 0.35 | 2.6 | 222, 227 |
| Ex. 5 | Yes | Trimethylmethoxysilane | 1-Hexene | 36,300 | 2.0 | 0.41 | 3.0 | 224 |
| Ex. 6 | Yes | " | 1-Octadecene | 31,400 | 2.2 | 0.40 | 2.9 | 224 |
| Ex. 7 | Yes | Trimethylethoxysilane | 1-Decene | 24,900 | 2.8 | 0.40 | 3.0 | 224 |
| Ex. 8 | Yes | Triethylmethoxysilane | " | 29,400 | 2.0 | 0.39 | 2.9 | 224 |
| Ex. 9 | Yes | Tri-n-propylmethoxysilane | " | 21,900 | 3.4 | 0.38 | 3.1 | 224 |

What is claimed is:

1. A process for producing a polymer or copolymer of 4-methyl-1-pentene, which comprises polymerizing 4-methyl-1-pentene or copolymerizing 4-methyl-1-pentene with up to about 20 mole % of an olefin having 2 to 20 carbon atoms at a temperature of from about 20° C. to about 100° C. and a pressure of from atmospheric to about 20 kg/cm², in the presence of a catalyst comprising (A) a solid active titanium catalyst component composed of magnesium, titanium, halogen and a di(C$_1$–C$_{20}$)alkyl ester in which the two alkyl groups may be identical or different, of dicarboxylic acids in which one carboxyl group is attached to each of the adjoining carbon atoms (at the ortho-position) of an aromatic hydrocarbon moiety having 6 to 20 carbon atoms, and the magnesium/titanium atomic ratio of the catalyst component (A) is from about 2 to about 100, the halogen/titanium atomic ratio of the catalyst component (A) is from about 4 to about 100 and the diester/titanium mole ratio of the catalyst component (A) is from about 0.2 to about 10, said titanium catalyst being characterized by not substantially liberating a titanium compound when treated with hexane at room temperature, and (B) a tri(C$_1$–C$_{15}$)-alkyl aluminum compound and (C) an organosilicon compound represented by the following formula

$$R^1{}_3Si(OR^2)$$

wherein each of $R^1$ and $R^2$ represents a hydrocarbon group with 1 to 5 carbon atoms, and the three $R^1$ groups may be identical or different, wherein prior to the polymerization or copolymerization, a methyl-pentene is pre-polymerized or pre-copolymerized in the presence of a catalyst comprising the catalyst component (A), a part of the catalyst component (B) and a part of the catalyst component (C) to form about 1 to about 1000 grams, per millimole of titanium atom, of a methylpentene polymer or copolymer, and the pre-polymerization or pre-copolymerization is carried out at a temperature of about −20° C. to about +70° C., and the polymerization or copolymerization is carried out at a temperature higher than that of the pre-polymerization or pre-copolymerization.

* * * * *